(12) United States Patent
Freedman et al.

(10) Patent No.: US 12,505,557 B2
(45) Date of Patent: Dec. 23, 2025

(54) SYSTEMS AND METHODS FOR PROVIDING A SHOW EFFECT USING A DETECTABLE MARKER

(71) Applicant: Universal City Studios LLC, Universal City, CA (US)

(72) Inventors: Daniel Matthew Freedman, Ocoee, FL (US); Sarah Anne Kelley, Orlando, FL (US); Brian Birney McQuillian, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 503 days.

(21) Appl. No.: 17/845,861

(22) Filed: Jun. 21, 2022

(65) Prior Publication Data

US 2023/0351609 A1    Nov. 2, 2023

Related U.S. Application Data

(60) Provisional application No. 63/336,121, filed on Apr. 28, 2022.

(51) Int. Cl.
*G06T 7/20*       (2017.01)
*G06T 13/00*      (2011.01)

(52) U.S. Cl.
CPC ...... *G06T 7/20* (2013.01); *G06T 2207/30204* (2013.01)

(58) Field of Classification Search
CPC ............. G06T 7/20; G06T 2207/30204
See application file for complete search history.

(56) References Cited

U.S. PATENT DOCUMENTS 8,965,898 B2    2/2015 Aman et al.
9,440,759 B2 *  9/2016 Reed .................. B65C 9/46
(Continued)

FOREIGN PATENT DOCUMENTS

AU    2016213755 B2    1/2018

OTHER PUBLICATIONS

PCT/US2023/019658 International Search Report and Written Opinion mailed Jul. 24, 2023.
(Continued)

*Primary Examiner* — Stephen R Koziol
*Assistant Examiner* — Joshua Chen
(74) *Attorney, Agent, or Firm* — Fletcher Yoder, P.C.

(57) ABSTRACT

A show effect system may include an applicator configured to apply a detectable marker, a camera configured to generate image data representative of an environment with the detectable marker, and a control system communicatively coupled to the camera and comprising a processor and a memory, wherein the memory stores instructions executable by the processor. The detectable marker may include an ultra-violet (UV) component with a detectable wavelength range corresponding to UV-A, UV-B or UV-C. The processor may execute the instructions that cause the processor to determine a motion of the detectable marker based on the image data and determine that the motion of the detectable marker corresponds to a target motion. The processor may also identify a show effect that may be associated with the target motion and trigger generation of the show effect in the environment.

20 Claims, 5 Drawing Sheets

(56) References Cited

U.S. PATENT DOCUMENTS

| | | | | |
|---|---|---|---|---|
| 2005/0271595 | A1* | 12/2005 | Brown | C11D 3/48 424/10.1 |
| 2009/0156309 | A1 | 6/2009 | Weston et al. | |
| 2009/0303447 | A1* | 12/2009 | Turner | G03B 21/28 353/50 |
| 2010/0144414 | A1* | 6/2010 | Edis | A63F 13/816 482/8 |
| 2010/0231692 | A1* | 9/2010 | Perlman | G06T 7/596 348/48 |
| 2015/0182152 | A1* | 7/2015 | Finger | A61F 9/0008 600/314 |
| 2015/0336013 | A1 | 11/2015 | Stenzler et al. | |
| 2015/0350537 | A1* | 12/2015 | Debevec | B60R 13/0256 348/169 |
| 2016/0136529 | A1 | 5/2016 | Weston et al. | |
| 2017/0245753 | A1* | 8/2017 | Donaldson | A61B 3/113 |
| 2018/0075659 | A1 | 3/2018 | Browy et al. | |
| 2018/0181214 | A1* | 6/2018 | Robinson | G06F 3/1423 |
| 2019/0057438 | A1* | 2/2019 | Dhankhar | G01G 19/40 |
| 2019/0318539 | A1* | 10/2019 | Weston | H04L 63/08 |
| 2020/0088831 | A1* | 3/2020 | Yachida | G01S 3/803 |
| 2020/0155953 | A1* | 5/2020 | Vance | A63G 21/18 |
| 2022/0354234 | A1* | 11/2022 | Park | A45D 44/005 |

OTHER PUBLICATIONS

Glo Germ: Visual Tool for Handwashing Training, Aseptic Techniques, Infection Control, Dec. 15, 2015, pp. 1-6, https://www.glogerm.com/.

UV Powders—Beyond the Visibility, Detective Store, Apr. 29, 2016, pp. 1-7, https://detective-store.com/blog_en/uv-powders-beyond-the-visibility/.

Ahmad, Mehsen Ahmad, et al., Kinect-Based Moving Human Tracking System with Obstacle Avoidance, Advances in Science, Technology and Engineering Systems Journal, Apr. 1, 2017, pp. 191-197, vol. 2, No. 3, https://www.semanticscholar.org/paper/Kinect-Based-Moving-Human-Tracking-System-with-Ahmad-Bazzal/3aa7cc03ac919de915db650db6af903c940fccbc.

Prabhu, Satish, et al., Real Time Skeleton Tracking based Human Recognition System using Kinect and Arduino, International Journal of Computer Applications, May 28, 2015, pp. 1-6, https://www.semanticscholar.org/paper/Real-Time-Skeleton-Tracking-based-Human-Recognition-Prabhu-Bhuchhada/8bd9e2aee27413c0b965fc1debdde87a3546b6f5.

Shomer-Tec, Ultraviolet Thief Detect Powder, Mar. 25, 2021, pp. 1-10, https://shomer-tec.com/products/ultraviolet-thief-detection-powder.

Anti-Theft Power!, Crime Scene, Jun. 25, 2010, pp. 1-3, https://www.youtube.com/watch?app=desktop&v=TDZe5PiXj54.

Anti-Theft: DNA Spray clings to suspects' skin, clothes, can be used to identfy them—TomoNews, TomoNews Sci & Tech, Oct. 29, 2017, pp. 1-5, https://www.youtube.com/watch?app=desktop&v=cch7CepqJuE.

Vanexiss Store, "UV Camera for Sunscreen Test UV Mirror Sunscreen Camera, 4 Inch Vanity Mirror Rechargeable Compact Travel Makeup Mirror Handheld Double-Sided Pocket Mirror for Skin Protection(Dark Black)," May 29, 2023, pp. 1-11, Amazon, https://www.amazon.com/UV-Mirror-Rechargeable-Double-Sided-Protection/dp/B0C5CGR4W7/ref=asc_df_B0C5CGR4W7?mcid=7fe2a0b20e223d3e&th=1.

Midopt, "Ultraviolet Imaging," Issued Sep. 17, 2015, pp. 1-2, https://midopt.com/solutions/monochrome- imaging/ultraviolet-imaging/# :~: text=When.

* cited by examiner

SYSTEMS AND METHODS FOR PROVIDING A SHOW EFFECT USING A DETECTABLE MARKER

CROSS-REFERENCE TO RELATED APPLICATION

This application claims priority to and the benefit of U.S. Provisional Application No. 63/336,121 filed Apr. 28, 2022, entitled "SYSTEMS AND METHODS FOR PROVIDING A SHOW EFFECT USING A DETECTABLE MARKER," which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, show components can be used to help immerse guests in an experience of a ride, an attraction, a performance, or a show. The show components may include three-dimensional (3D) props and set pieces, mechanical elements, electrical elements, chemical elements, and/or display surfaces that present media. In some cases, the guests may provide inputs that trigger the show components to provide show effects.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a show effect system may include an applicator configured to apply a detectable marker, a camera configured to generate image data representative of an environment with the detectable marker, and a control system communicatively coupled to the camera and comprising a processor and a memory, wherein the memory stores instructions executable by the processor. The detectable marker may include an ultra-violet (UV) component with a detectable wavelength range corresponding to UV-A, UV-B or UV-C. The processor may execute the instructions that cause the processor to determine a motion of the detectable marker based on the image data and determine that the motion of the detectable marker corresponds to a target motion. The processor may also identify a show effect that may be associated with the target motion and trigger generation of the show effect in the environment.

In an embodiment, a show effect method may include applying, via an applicator, a marker to a guest, wherein the marker comprises a chemical component detectable in a wavelength range between 10 and 400 nanometers. The method may then receive, using one or more processors, image data from a camera configured to record image data in the wavelength range between 10 and 400 nanometers. The image data may comprise the marker in an environment. The method may also identify, using the one or more processors, a specific representation of the marker within the image data and determine a motion of the marker based on the image data. The method may also determine, using the one or more processors, that the motion of the marker corresponds to a target motion and identify a show effect associated with the target motion. The method may then generate, using the one or more processors, the show effect in the environment In an embodiment, a show effect system may include a control system comprising a processor and a memory. The memory stores instructions executable by the processor, and the instructions are configured to cause the processor to receive image data comprising a marker that is applied to a guest or a performer in an environment. The marker may comprise an ultra-violet (UV) component. The processor may also determine a motion of the marker based on the image data and determine that the motion of the marker corresponds to a target motion. The processor may then identify a show effect that is associated with the target motion and trigger generation of the show effect in the environment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
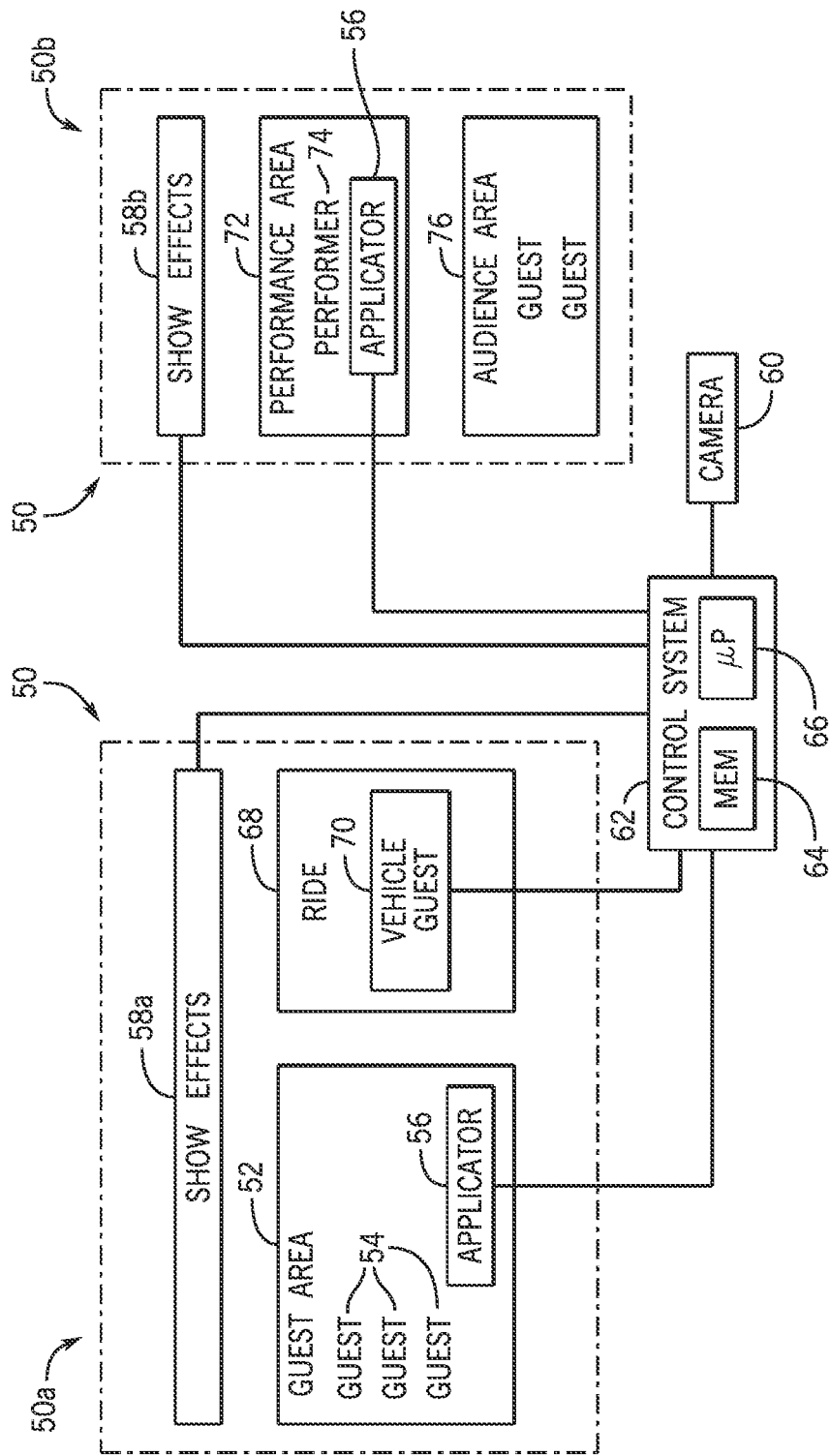
FIG. 1 is a schematic diagram of an embodiment of an attraction system that may be used in an amusement park, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure generally relates to systems and methods for providing show effects, such as in an amusement park. The amusement park may include a variety of features, such as rides (e.g., a roller coaster), theatrical shows, set designs, performers, and/or decoration elements, to entertain guests. The show effects may be used to supplement or complement the features to provide the guests with a more immersive, interactive, and/or unique experience. For example, the show effects may be presented to emulate real world elements in order to present a more realistic atmosphere for the guests. In another example, the show effects may be presented to create fictional characters, a fantasy world, and/or special effects (e.g., spells, magic) to construct a storyline or environment for the guests.

Embodiments of the present disclosure are directed to a show effect system that operates to present one or more show effects in real-time (e.g., real-time or near real-time) based on detection of a detectable marker. The term 'real-time' or 'near real-time' may mean processing input data within milliseconds, so that feedback (e.g., show effects) may be created almost instantaneously. As described herein, the show effect system may track a detectable marker, determine that a motion of the detectable marker corresponds to an associated motion for activating a show effect, and trigger generation of the show effect in real-time.

Advantageously, in an embodiment, the guests may create show effects during a visit to a ride without the guests carrying or otherwise handling a prop or tangible object. Instead, the guests may enter the ride and receive the detectable marker from an applicator. The guests may also learn about different show effects that may be activated within the ride and an associated motion for activating the show effect. The show effect system may track the detectable marker, determine that the guest has performed the associated motion for activating the show effect (e.g., based on a movement pattern of the detectable marker), and then trigger the show effect. For example, one of the guests may receive the detectable marker on a hand and wave the hand in a certain pattern during the ride to activate the show effect. As such, the guests may efficiently and effectively control certain aspects of the ride, such as the generation of the show effects, without use of a prop or tangible object. In this manner, the show effects may appear to be created in real-time due to the guests' motion, and thus, enhance the experience of the guests within the ride. Accordingly, the show effect system may provide an immersive and interactive environment for the guests on the ride.

In an embodiment, the show effect system and performers may create an interactive show experience for guests. For example, a performer may receive the detectable marker from the applicator. The performer may be part of a performance or show that utilizes the show effects to create a unique storytelling experience for the guests. For example, the performer may receive a small number of detectable markers, such as three detectable markers located on the performer's face, hand, and foot. Advantageously, the show effect system may utilize the small number of detectable markers rather than a larger number of markers that are positioned to create a more detailed skeletal tracking system for the performer. Then the show effect system may track a motion of the small number of detectable markers on the performers to create the show effects for the performance. Limiting the number of markers tracked by the show effect system may limit the variability of the show effect system, decrease a response time (e.g., low latency), and/or decrease processing power. As such, the show effect system may operate in real-time to create a captivating experience for the guests. Accordingly, the performers and the show effect system may utilize the show effects to facilitate storytelling or to enhance the experience for the guests.

Additionally or alternatively, the guests may participate in the performance by triggering certain show effects during the performance. That is, the guests may receive the detectable marker at an audience area before the performance. During the performance, the performer may ask the guests to move their hands in a certain manner (e.g., motion, pattern), which may trigger the generation of the show effects to aid in the storytelling of the performance. As such, the guests may complement the performers or the performance by creating unique show effects with the detectable marker and without the use of a prop or tangible object. In this manner, the show effect system may create an interactive and/or immersive performance for the guests. Accordingly, the detectable marker and the show effect system may collectively provide a unique and/or responsive presentation of the show effects for the guests of the amusement park.

With the preceding in mind, FIG. 1 is a schematic diagram of an embodiment of an attraction system 50 that may be used in an amusement park. For example, the attraction system 50 may include a first attraction system 50a and a second attraction system 50b. The first attraction system 50a may include a roller coaster, a motion simulator, a water ride, a walk-through attraction (e.g., a maze), or the like, and the second attraction system 50b may include a show area, a performance area, an entertainment area, a production area, or the like. The first attraction system 50a may include a guest area 52 where various guests 54 may be located. The guest area 52 may include an open space, such as a walkable area (e.g., a queue or line) where guests may enter the attraction system 50, exit the attraction system 50, or otherwise navigate through the attraction system 50.

The guest area 52 may also include an applicator 56, which may be used to apply the detectable marker to one or more of the guests 54. The detectable marker may be applied in the form of a powder, a liquid, a gel, a stamp, or the like to a body part of the guest 54. For example, the applicator 56 may be a stamp that an operator or the guest 54 may grip and manipulate to apply the detectable marker to a hand of the guest 54. In another example, the applicator 56 may be a hand sanitizer dispenser that the guest 54 may actuate (e.g., pump) to apply the detectable marker. In still another example, the applicator 56 may be a hidden or stealth applicator, which may be particularly useful in high throughput rides to rapidly apply the detectable marker to the guests 54. The detectable marker may be an invisible marker that includes an ultra-violet (UV) component, such as a UV powder, UV liquid, UV paint, or UV polymer. The detectable marker may be invisible to the guests 54 (e.g., to the human eye; substantially invisible in ambient lighting), but may be detected by a show effect system to trigger generation of show effects 58a within the first attraction system 50a. For example, the hand sanitizer dispenser may include any fluid, including hand sanitizer, mixed with the UV component for guests to actuate and apply the detectable marker. The detectable marker may also be applied to skin or clothing of the guests 54, and may also be temporary and removable from the guests 54 via water and/or soap (e.g., hand washing). While it may be preferable in certain cases that the guests 54 do not carry objects to provide the inputs to trigger the show effects 58a, it should be appreciated that the detectable marker may be applied to objects that are carried by the guests 54 (e.g., props, toys, wearable devices).

The guest area 52 may also include a display or a monitor that educates the guests 54 about one or more show effects 58a associated with and/or available in the first attraction system 50a. The show effects 58a may include light effects, a moveable object (e.g., a physical prop, such as a robot), smoke effects, audio effects, water effects, digital effects, display effects (e.g., including displayed animated characters), and the like. The show effects 58a may be related to a theme of the first attraction system 50a to facilitate a storytelling aspect of the first attraction system 50a and/or to create an immersive experience for the guests 54. For example, the first attraction system 50a may be related to an underwater adventure and the show effects 58a may involve spraying water, puffs of smoke, siren sounds, or the like. Although the illustrated embodiment shows the show effects 58a located outside of the guest area 52, the show effects 58a may be at least partially located within the guest area 52.

Referring back to the display or monitor of the guest area 52, the guests 54 may view a video on the display to learn about one or more motions associated with one or more show effects 58a. For example, the display may contain a virtual tour guide (e.g., animated character) to teach the guests 54 about different show effects 58a associated with and/or available in the first attraction system 50a. After the presentation, the virtual tour guide may practice the show effects 58a with the guests 54. That is, the display may also include a camera 60 to identify the detectable marker on the guest 54 and detect a motion of the detectable marker. For example, the guest 54 may wave at the virtual tour guide within the display and the virtual tour guide may wave back in response to the guest's wave. In another example, the guest 54 may move their hand in a throwing motion to throw a virtual ball to the virtual tour guide. As such, the guests 54 may understand how to trigger generation of show effects 58a within the first attraction system 50a. In certain embodiments, the display may generate the show effects 58a to welcome the guests 54 to the first attraction system 50a or entertain the guests 54 within the guest area 52.

In certain embodiments, the first attraction system 50a may include the camera 60 to generate image data (e.g., moving image data, such as video data) of the first attraction system 50a. The camera 60 may be a UV camera that may generate the image data in the UV part of the electromagnetic spectrum at wavelengths below 400 nanometers (nm). The camera 60 may also be a digital camera with a UV filter or any suitable filter for detecting light at wavelengths below 400 nm. The camera 60 may transmit the image data to a control system 62 for processing (e.g., image analysis, machine learning). The control system 62 may receive the image data of the first attraction system 50a and process the image data to identify one or more detectable markers within the first attraction system 50a.

The control system 62 may include a memory 64 and processing circuitry 66. The memory 64 may include volatile memory, such as random-access memory (RAM), and/or non-volatile memory, such as read-only memory (ROM), optical drives, hard disc drives, solid-state drives, or any other non-transitory computer-readable medium that includes instructions to operate the attraction system 50. The memory 64 may also include a database of detectable markers (e.g., characteristics, such as shape, color/wavelength, size, number), one or more associated motions, and associated show effects 58 for the attraction system 50. The processing circuitry 66 may be configured to execute such instructions. For example, the processing circuitry 66 may include one or more application specific integrated circuits (ASICs), one or more field programmable gate arrays (FPGAs), one or more general purpose processors, or any combination thereof.

The control system 62 may further determine one or more motions (e.g., movement patterns; gestures) associated with the detectable marker and one or more corresponding show effects 58a for the first attraction system 50a. As such, the control system 62 may detect a motion of the one or more detectable markers that may be associated with the show effect 58a and, in response, automatically trigger generation of the show effects 58a. For example, the control system 62 may receive image data from the camera 60 with one or more detectable markers. The control system 62 may identify the one or more detectable makers, determine a motion of one of the detectable markers, and determine if the motion corresponds to an expected input (e.g., stored motion; target motion; target input) to trigger generation of the show effects 58a within the first attraction system 50. For example, the control system 62 may search a database or any suitable storage component that may store motion(s) and show effect(s) 58a (e.g., in association with one another; in a look-up table; in a library). If the motion corresponds to one of the stored motions, the control system 62 may trigger generation of the associated or corresponding show effect(s) 58.

In an embodiment, the control system 62 may implement image recognition techniques such as secondary imaging, template matching, or the like to distinguish the detectable marker from any transferred markings within the first attraction system 50a (e.g., based on a shape of the transferred markings in the image data). For example, the guest 54 may cover both hands with the detectable marker and then transfer parts of the detectable marker to another object (e.g., body part, clothing, guest) by touching the object (e.g., before the detectable marker has completely dried). As a more specific example, the guest 54 may receive the detectable marker via a hand sanitizer dispenser with the UV component (e.g., powder) while in the guest area 52. The guest 54 may touch their face before the hand sanitizer has completely dried and transfer parts of the detectable marker to their face. The control system 62 may be trained (e.g., machine learning, image recognition) to identify a certain shape of the detectable marker and/or a certain motion associated with the detectable marker. For example, the control system 62 may look specifically for the shape of a hand and/or a certain motion associated with the hand (e.g., waving) to activate the show effects 58a. As another example, the control system 62 may look specifically for a known shape of a stamp and/or a certain motion associated with the hand (e.g., waving) to activate the show effects 58a. As such, the control system 62 may identify the detectable marker, determine the motion of the detectable marker, and trigger the show effects 58a based on the motion of the detectable marker.

In an embodiment, the first attraction system 50a may also include a ride 68 (e.g., ride attraction), which may have a vehicle 70 (e.g., ride vehicle). The ride 68 may, for example, include a roller coaster, a water ride, a motion simulator, a dark ride, and so forth. To this end, the vehicle 70 may move (e.g., translate, rotate, pivot) about a motion base and/or along a track of the first attraction system 50*a*. However, it should be appreciated that the vehicle 70 may remain stationary within the first attraction system 50*a*. One or more guests 54 may be positioned within the vehicle 70. As an example, the guests 54 may enter the vehicle 70 from the guest area 52 and/or exit the vehicle 70 to the guest area 52 to move between the guest area 52 and the ride 68. The ride 68 may entertain the guests 54 via movement of the vehicle 70, such as by providing certain movement sensations for the guests 54. Additionally or alternatively, the show effects 58*a* may entertain the guests 54 positioned in the vehicle 70, such as by providing various visual and/or audio effects. In this manner, the show effects 58*a* may be controlled to entertain guests 54 in the guest area 52 and/or the ride 68.

In certain embodiments, the control system 62 may be communicatively coupled to the show effects 58*a* and the ride 68 to facilitate a storytelling aspect of the first attraction system 50*a* and/or create an immersive experience for the guests 54. For example, the control system 62 may control movement of the vehicle 70 within the first attraction system 50*a* and/or various outputs provided by the show effects 58*a*. In an embodiment, the control system 62 may set, adjust, and/or change one or more parameters of the show effects 58*a*, such as to control the appearance of the show effects 58*a*. As an example, the control system 62 may adjust an appearance of the show effects 58 by adjusting an intensity, a color, and/or an illuminated area associated with the light effects. Further still, the control system 62 may adjust a motion and/or speed of the vehicle 70. The control system 62 may adjust both the appearance of the show effects 58 and the motion and/or the speed of the vehicle 70 at the same time (e.g., in a coordinated manner) to create immersive experiences, such as to cause the show effects 58*a* to appear to move or travel in a certain manner relative to the vehicle 70. For example, the first attraction system 50*a* may provide the show effects 58*a* including a monster (e.g., a physical prop or on the display) chasing the ride vehicle 70, and the guests 54 may move their bodies to move the detectable markers in a way that causes the control system 62 to create additional show effects 58*a* to fight the monster (e.g., make a striking motion to cause the control system 62 to simulate lightning strikes near the monster via the light effects or on the display; make an undulating wave motion to cause the control system to simulate a tsunami wave to knock down the monster in a physical space or on the display; make a raising and holding motion to cause the control system 62 to stop the monster in the physical space or on the display; make a throwing motion to cause the control system 62 to display a visual representation of thrown objects striking the monster on the display). The control system 62 may also adjust the appearance of show effects 58*a* in any other suitable manner to provide a particular experience via the show effects 58*a* for the guests 54 within the vehicle 70 and/or the guest area 52. It should be appreciated that the control system 62 may use the motion of the detectable makers to control the motion and/or the speed of the vehicle 70 and the show effects 58*a*. Accordingly, the show effect system, which may be considered to include the control system 62, the camera 60, the applicator 56, the vehicle 70, and/or components that provide/output the show effects 58*a*, may provide an immersive and interactive experience for guests 54 in the first attraction system 50*a*.

In an embodiment, the attraction system 50 may include the second attraction system 50*b*, which may consist of a performance (e.g., show, production, concert) in a performance area 72 by one or more performer(s) 74. The second attraction system 50*b* may include its own applicator 56 in the performance area 72, which may apply the detectable marker to the one or more performer(s) 74. In an embodiment, a performer 74 may receive one or more detectable markers on a part of their body for generation of show effects 58*b* for a component of the performance. For example, the performer 74 may receive the detectable markers on both their hands and feet. The camera 60 may generate image data of the performance area 72 and transmit the image data to the control system 62 for image processing (e.g., image recognition, machine learning). In another example, the performer 74 may receive one or more detectable markers to control more sophisticated show effects 58*b* that may benefit from additional points. For example, the show effects 58*b* may include a monster with four limbs that may be controlled by the performer 74. It may be beneficial to place the detectable marker on both the hands and feet of the performer 74 and associate the motion of the detectable markers to a motion of the monster to provide a realistic performance. That is, the show effect system may track four markers rather than an entire skeletal system of the performer 74 (e.g., which may have multiple markers on each limb). This relatively simplified tracking method may allow for efficient application of the detectable markers to the performer 74, as well as efficient application of the detectable markers to multiple different performers 74 over time (e.g., having different body shapes and sizes). In this way, the control system 62 may provide precise and/or realistic live show effects 58*b* in response to the motion of the performer 74 in real-time (e.g., with low latency). As described herein, the show effects 58*b* may also include light effects, a movable object, smoke effects, audio effects, water effects, sound effects, display effects, and the like. For example, the show effects 58 may also include one or more three-dimensional props and set pieces, mechanical elements, and/or display surfaces that present media that may be controlled by the performer(s) 74 imparting motion of the detectable markers positioned on the performer(s) 74. Although the show effects 58*b* are located outside of the performance area 72 in the illustrated second attraction system 50*b*, the show effects 58*b* may be at least partially located within the performance area 72 and/or an audience area 76.

In certain embodiments, the guests 54 located in the audience area 76 may create the show effects 58*b* to enhance the performance. That is, the second attraction system 50*b* may include the audience area 76 where various guests 54 may be located to watch or participate in the performance. In an embodiment, the audience area 76 may include an open space, such as an auditorium where guests 54 may sit, stand, or otherwise watch the performance, a walkable area (e.g., queue or line) where guests 54 may enter the second attraction system 50*b*, exit the second attraction system 50*b*, or otherwise navigate through the second attraction system 50*b*. The guests 54 in the audience area 76 may receive their own detectable marker via the applicator 56. Then, the detectable marker may be tracked by the camera 60 to trigger creation of the show effects 58*b* during a performance. For example, the audience area 76 may include twenty guests 54. In an embodiment, each guest 54 may receive the detectable marker. As such, the control system 62 may look for and track twenty detectable markers that correspond to the guests 54 in the audience area 76 (e.g., only the twenty detectable markers, rather than a skeletal system of each guest in the audience area). In another example, the guests 54 in the audience area 76 may create certain show effects 58*b* (e.g., spells, distractions, objects) to fight or help the monster controlled by the performer 74. In this way, the show effect system may create an improved performance experience for the guests 54.

It should be appreciated that the layout and arrangement of the first attraction system 50a and the second attraction system 50b in FIG. 1 is merely exemplary, and any of a variety of attraction systems may be arranged in any suitable manner. Furthermore, any of a variety of attraction systems may be controlled and/or include the show effect system. Moreover, certain components of the show effect system may be shared between the attraction systems (e.g., the applicator 56 applies the detectable markers to the guests 54 for multiple attraction systems) and/or respective components of the show effect system may be provided for each of the attraction systems (e.g., one or more cameras 60 for one attraction system and one or more cameras for another attraction system). Indeed, the control system 62 may be shared between/in communication with the attraction systems or may be dedicated to its own attraction system.

Figure 2:
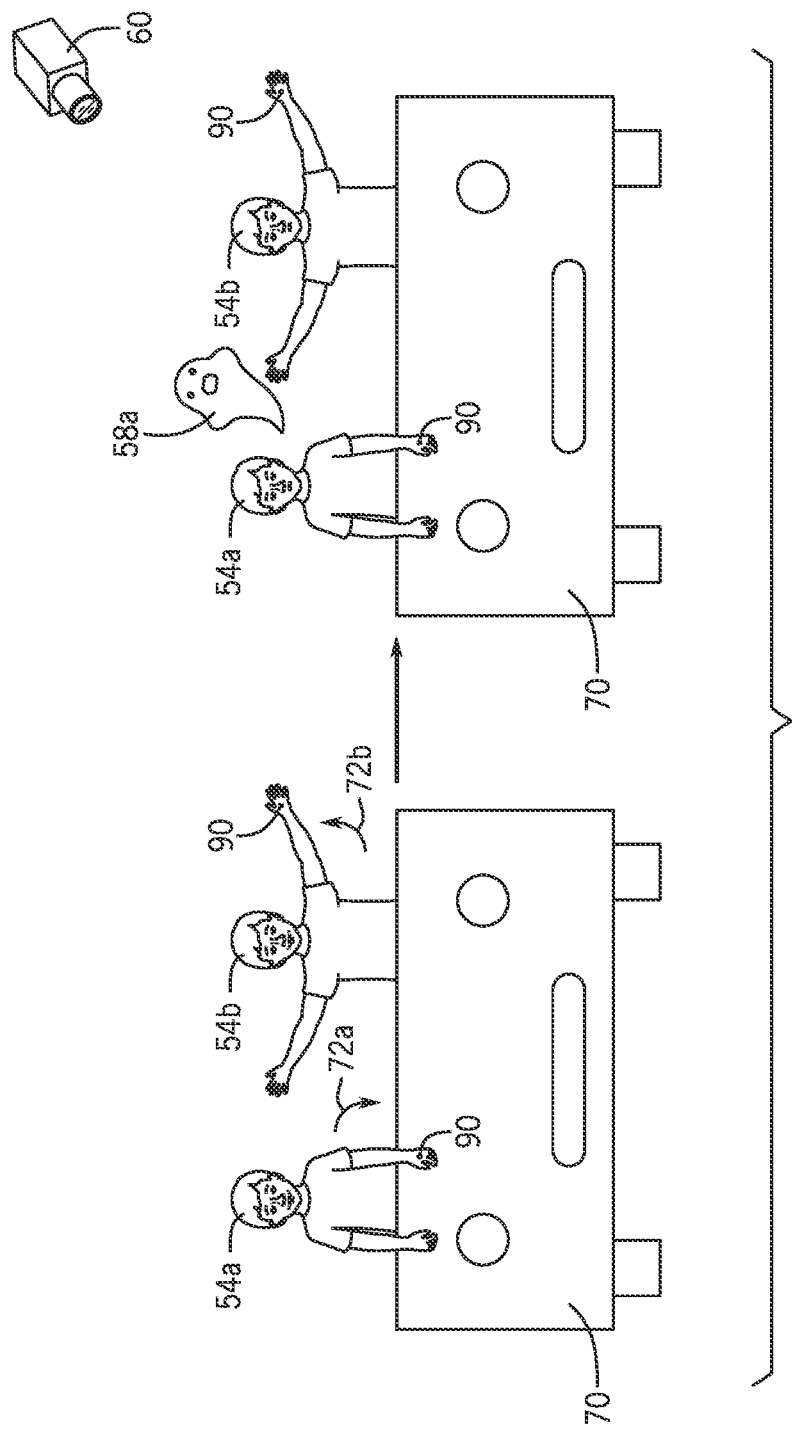
FIG. 2 is a schematic illustration of guests triggering show effects in a ride attraction via the attraction system of FIG. 1, in accordance with an aspect of the present disclosure.

With the foregoing in mind, FIG. 2 is an example illustration of the guests 54 triggering generation of the show effects 58a within the first attraction system 50a. For example, the guests 54 in the first attraction system 50a may each have one or more detectable markers that the guests 54 may move in a certain motion to trigger generation of the show effects 58a. The first attraction system 50a may include the camera 60 that captures the image data and transmits the image data to the control system for processing. The control system may identify the one or more detectable markers within the image data and determine a motion of the one or more detectable markers, which may or may not correspond to an associated show effect 58a (e.g., one or more of the available show effects 58a).

With the foregoing in mind, the first attraction system 50a may include the ride 68 with the vehicle 70 and two guests 54 (e.g., left guest 54a, right guest 54b). The guests 54 may have received or applied a detectable marker 90 in the guest area 52 or prior to entering the vehicle 70. In the illustrated embodiment, the detectable marker 90 may be a dot on a hand of the guest 54a, 54b. In other embodiments, the detectable marker 90 may be any suitable size, shape, or detectable wavelength of the UV spectrum (e.g., UV-A, UV-B, UV-C). The detectable marker 90 may also be placed on different parts of the guest 54, such as a foot, a face, a finger for example. In another example, the guests 54 in different seats of the vehicle 70 and/or on different vehicles 70 may receive detectable markers 90 on different locations of their hand or on different hands (e.g., right, left) such that the show effect system may distinguish between the different guests, vehicles, and/or groups of guests 54. In another example, the show effect system may distinguish the guests 54 by applying (e.g., instructing the applicator 56 to apply; programming the applicator 56 to automatically rotate through/dispense) different detectable markers 90 that may be detectable at different wavelengths. In another example, the guests 54 may receive the detectable marker 90 that may include a different number of dots, shapes, and/or patterns (e.g., defined or prescribed dots, shapes, and/or patterns, including quick response [QR] codes, bar codes, alphanumeric codes). It should be appreciated that the applicator 56 may be configured to detect existing detectable markers 90 on the guests 54 (e.g., via a camera on the applicator 56) to facilitate application of the different detectable markers 90 to the guests 54 and/or to block application of two detectable markers 90 to a single guest 54. These distinctions in the detectable markers 90 applied to the different guests 54 may enable the show effect system to identify the respective motions of the detectable markers 90 and to provide personalized responses/show effects 58a for the guests 54. For example, each of the guests 54 may have a personalized avatar (or other personalized feature), and the control system may control the avatar (or the other personalized feature) based on the input from the corresponding guest 54. Since the show effect system tracks the detectable marker 90 rather than an entire skeletal system of the guest 54, the system may quickly be able to distinguish between the different guests 54 within the first attraction system 50a and generate a response in real-time in response to detecting the trigger/input. In this way, the show effect system may utilize relatively few inputs (e.g., multiple trackers, guest attributes), which may increase efficiency and response time.

The control system may determine a motion 72a, 72b associated with a respective guest 54a, 54b by tracking a motion of the associated detectable markers 90. For example, the control system may determine a location of the detectable marker 90, which may be indicative of the respective guest 54a, 54b. The control system may trigger generation of the show effect 58a in relation to the location of the detectable marker 90. For example, the two guests 54a, 54b may move a hand with the detectable marker 90 in different motions to trigger different show effects 58. The left guest 54a may move their hand in a downwards motion 72a and the right guest 54b may move their hand in an upwards motion 72b. The control system may determine the motion by tracking the detectable marker 90. The control system may distinguish between the two motions and trigger the creation of different show effects based on the different motions. For example, the downward motion created by the left guest 54a may trigger generation of a show effect 58a, while the upward motion created by the right guest 54b may not trigger any show effect 58a. In the illustrated embodiment, the downward motion may trigger generation of a ghost (e.g., on a display screen) and the upward motion may not trigger any show effect. The generated show effect 58a, such as the ghost, may be displayed close to the left guest 54a based on the location of the detectable marker 90. The right guest 54b may be moving their hand in the upward motion to scratch their head rather than to generate the show effect 58a. Accordingly, the control system may distinguish between a successful attempt (e.g., the motion matches a library of motions and corresponding show effects) and an unsuccessful attempt (e.g., the motion does not match the library) at creating show effects 58a and generate the successful show effect 58a proximate to the detectable marker 90 that triggered the show effect 58a (e.g., closer to the detectable marker 90 that triggered the show effect 58a relative to other detectable markers 90). It should also be appreciated that the two motions may trigger creation of different show effects (e.g., the downward motion generates the ghost and the upward motion causes a light to turn on). Furthermore, the two motions at the same time (e.g., substantially the same time) or in certain sequences (e.g., one after the other) may trigger coordinated show effects (e.g., the downward motion generates the ghost and the upward motion causes the ghost to fly away).

Figure 3:
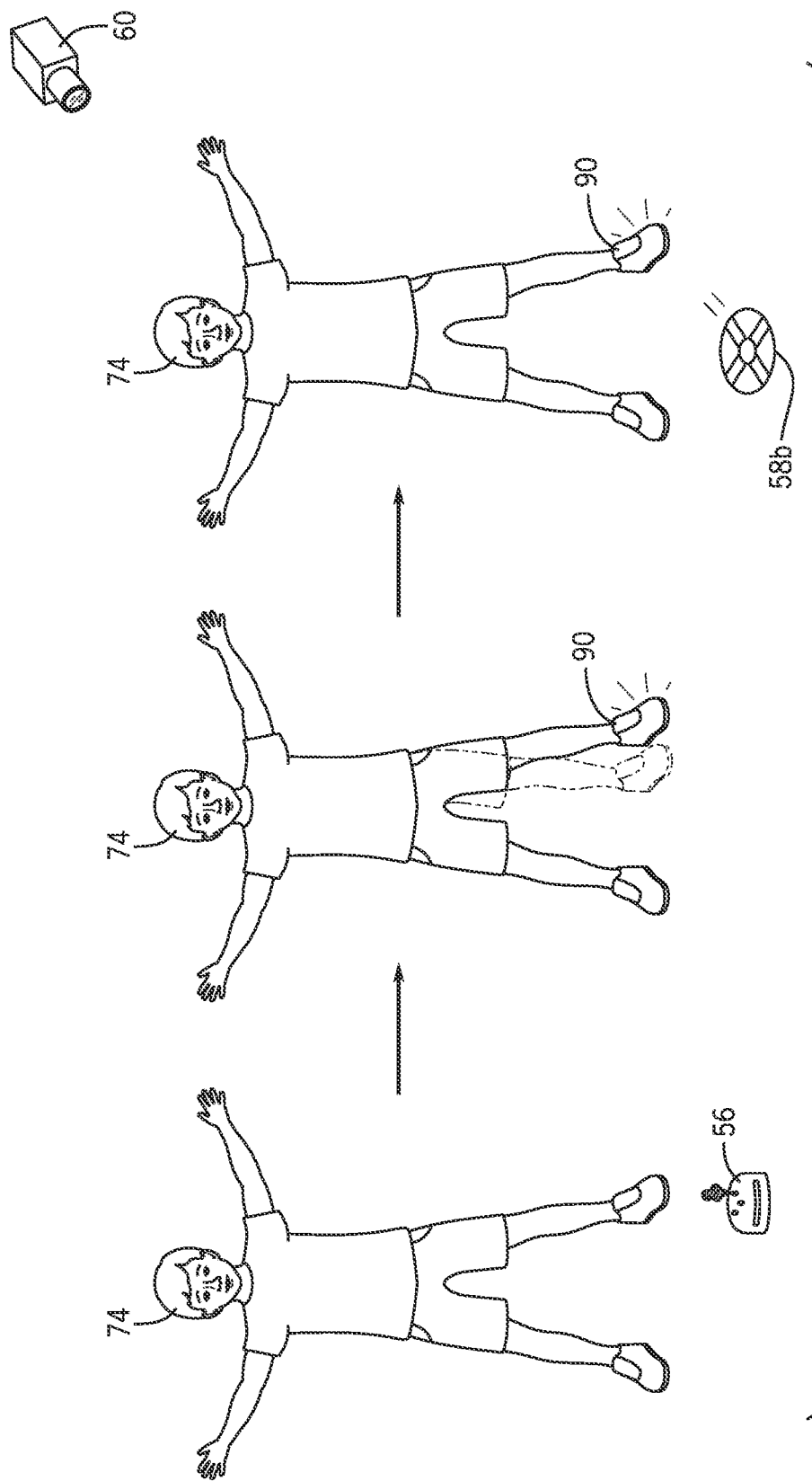
FIG. 3 is a schematic illustration of guests triggering show effects during a performance via the attraction system of FIG. 1, in accordance with an aspect of the present disclosure.

FIG. 3 is an example illustration of the performer 74 using show effects 58b to create an immersive and interactive performance. For example, the performer 74 may use the applicator 56 to apply a detectable marker 90 and the camera 60 of the second attraction system 50b may track the marker 90. In the illustrated embodiment, the performer 74 may apply the detectable marker 90 to a foot or a shoe. However, the performer 74 may apply the detectable marker 90 to a hand, a face, or any suitable body part. When applying the detectable marker 90 to the performer 74, the detectable marker 90 may include one or more shapes (e.g., dots, squares) with one or more UV wavelengths depending on the performance and/or the associated show effects 58b. For example, the performer 74 may control an animated figure (e.g., a real, physical figure; a virtual figure on a display screen), such as a wizard, a shark, a monster, a superhero, or the like. It may be beneficial to apply multiple detectable markers 90 to the performer 74 to enable the performer 74 to separately and/or more finely control the one or more different parts of the animated figure. For example, if the performer 74 waves a right hand with one of the detectable markers 90 and kicks a right foot with one of the detectable markers, the control system may cause the animated figured to move their right hand and their right foot as well (e.g., mimic the performer 74). It should be appreciated that the performer 74 may cause any of a variety of show effects 58b (e.g., not merely mimicking the performer 74; waving their right hand causes a color of light to change, kicking their right foot causes a sound effect, and so on). The show effects system may not be calibrated to a height or a size of the performer 74 like certain skeletal systems, rather the show effect system disclosed herein may associate the one or more detectable markers 90 with the one or more body parts of the performer and one or more corresponding body parts of the animated figure (or other show effects 58b). Accordingly, the show effect system may trigger the show effects 58b in real-time with low latency control of the animated figure or other show effects 58b.

The show effect system may associate a motion of the performer 74 with a show effect 58b by tracking one or more detectable markers 90 on the performer 74. For example, the camera 60 may capture image data of the performer 74 and the control system may identify the detectable marker 90 on the foot of the performer. In the illustrated embodiment, the performer 74 may move a foot with the detectable marker 90 in a kicking motion, such as to kick a ball. Thus, the control system may determine the detectable marker 90 travels through space (e.g., as indicated by the image data) in a manner that matches (e.g., substantially matches) a stored kicking motion (e.g., target kicking motion; in the library). The control system may also determine and identify that the stored kicking motion may be associated with a particular show effect 58b (e.g., via the library), such as a soccer ball flying through the performance area 72 and/or the audience area 76. As such, the show effect system may generate a performer-guided show effect 58b in response to identifying the motion of the detectable marker 90 (e.g., the kicking motion with the detectable marker 90) and the corresponding show effects 58b.

In another example, the performance may be set in a fantasy or virtual world. The performer 74 may be stomping through a forest as an animated figure, such as a warrior, presented on a display screen. The show effect system may track body parts of the performer 74, via detection of the detectable markers 90, to control one or more limbs of the animated figure or to accurately track or follow the motion of the performer 74. Additionally or alternatively, the performance area 72 may have one or more 3D props, physical props, electrical elements, chemical elements, and/or displays to facilitate the story telling aspect of the performance. For example, the performer 74 may control the warrior being chased by a monster through the forest. As such, it may be beneficial for the show effect system to associate one or more body parts of the performer 74 to one or more body parts of the warrior. The detectable markers 90 may be placed on a foot, a hand, and/or a head of the performer 74, which may be used to control similar body parts of the warrior. While the warrior is presented as running through the forest, the performer 74 may make dodging movements in order to cause the warrior to appear to dodge (e.g., be presented as dodging) one or more trees of the fantasy world. Accordingly, the show effect system may provide real-time show effects 58b in response to the motion of the performer 74.

Additionally or alternatively, the guests 54 in the audience area 76 may also create show effects 58b during the performance. For example, the guests 54 may receive a detectable marker 90 by the applicator 56 in the audience area 76. The performers 74 may ask the guests 54 (or the guests 54 may be prompted in any suitable manner) to create a certain motion with the detectable marker 90 as part of the performance. For example, the performer 74 may teach the guests 54 how to create spells, shoot arrows, and/or perform other attacks as part of the performance. In another example, the guests 54 may battle against the performer 74 in the fantasy world by moving the detectable markers 90 in certain ways that cause the show effect system to create and/or present additional monsters or obstacles for the performer 74 to dodge or fight. Accordingly, the performance may allow the performer 74 and the guests 54 to interact with both the physical and digital worlds to create an immersive experience for the guests 54.

Figure 4:
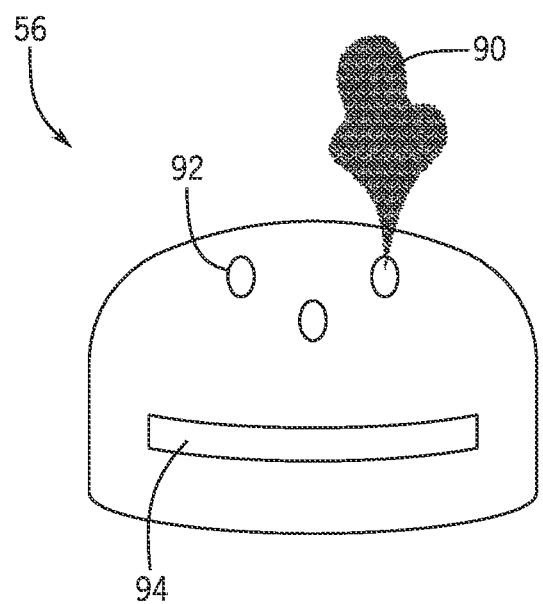
FIG. 4 is a close-up view of an embodiment of an applicator that may be used in the attraction system of FIG. 1, in accordance with an aspect of the present disclosure.

FIG. 4 is an example illustration of an embodiment of the applicator 56 that may be used to apply the detectable marker 90 to the guests 54 and/or the performers 74. In the illustrated embodiment, the applicator 56 may include one or more holes 92 that may output the detectable marker 90 to the guests 54 or the performers 74. For example, the performer 74 may place a hand over the one or more holes 92 to have the detectable marker 90 strategically applied to a side of the hand. As shown, the applicator 56 is configured to form the detectable marker 90 with three dots on the palm of the hand, although the detectable marker 90 may include any number of dots or separate regions in any suitable arrangement (e.g., 1, 2, 3, 4, 5, or more). In another example, the guest 54 may place a hand over the holes 92 and receive a single dot on the back of the hand. In an embodiment, the applicator 56 may also include a slot 94 that may receive and accommodate a hand to facilitate application of the detectable marker 90. For example, the guest 54 may place the hand into the slot 94, and then the detectable marker 90 is applied to the hand positioned in the slot 94. The applicator 56 may also apply the detectable marker 90 to the guests 54 as the guests 54 walk by and/or stand in proximity of the one or more holes 92. The applicator 56 may apply the detectable marker 90 to one individual at a time or to multiple individuals simultaneously.

The detectable marker 90 may be a liquid, a gel, a stamp, or a powder with a UV component (e.g., powder, chemical) that may be detected by the camera 60. The detectable marker 90 may be a single dot with a single UV wavelength or multiple dots with one or more UV wavelengths. As such, the detectable marker 90 may be distinguished (e.g., UV-A, UV-B, UV-C) by the camera 60. For example, the guest 54 may place their hand in the slot 94 of the applicator 56 to receive a puff of powder with the detectable marker 90 of a certain wavelength. The detectable marker 90 may also be placed on any body part of the guest 54 or the performer 74. For example, the detectable marker 90 may be placed on a hand, a face, a foot, an arm, a leg, or any suitable location. Additionally, the placement of the detectable marker 90 may not need to be precise since the camera 60 may identify the detectable marker 90 and associate a motion rather than creating or mapping an entire skeletal system. The shape or size of the detectable marker 90 may not need to be precise since the show effect system may use image recognition or a machine learning technique to identify the marker 90. For example, the guest 54 may accidently receive a semi-circle rather than a full circle as the detectable marker 90. The show effect system may use image recognition techniques and/or machine learning (e.g., machine learning models are trained and/or updated over time) to identify the semi-circle as the detectable marker 90. In another example, the show effect system may determine a motion of the semi-circle detectable marker 90 and associate the motion with a show effect 58 as set forth herein. Then, the show effect system may further trigger the generation of the show effect 58 based on the motion of the semi-circle marker 90.

In an embodiment, the applicator 56 may be a container, such as a bottle, of lotion or hand sanitizer for the guest 54 or the performer 74 to apply the detectable marker 90 by themselves. For example, the guest 54 may apply a hand sanitizer with a UV component as the detectable marker 90. As such, the guest 54 may coat both hands with the detectable marker 90. In another embodiment, the applicator 56 may be a hidden or stealth applicator. For example, the applicator 56 may be an element in the attraction, a restraint of the vehicle 70 (e.g., a lap bar or seat belt), a handrail, or the like. For example, the guest may touch and/or approach (e.g., be in proximity of) an object, such as a baseball, a storybook, a wand, or a hat to apply the detectable marker 90. The object may discreetly (e.g., unknown to and/or not perceived by the guest 54) apply the detectable marker 90 via a puff of powder or application of another substance to a body part (e.g., hand, foot, face) of the guest 54. In this way, the applicator 56 may facilitate a storytelling aspect of the ride or performance. Still in another embodiment, the applicator 56 may be a stamp that may be applied by an operator or by the guest 54 to the guest 54. In yet another embodiment, the applicator 56 may be a makeup set that may be used to apply the detectable marker 90 to a face or other body part of the performer 74.

The applicator 56 may also include one or more reservoirs that contains the detectable marker 90 and/or the UV component (e.g., powder, gel, liquid). The UV component may allow the detectable marker 90 to be detected at different wavelengths (e.g., UV-A, UV-B, UV-C) by the camera 60 (e.g., UV camera) to distinguish between guests 54 or different body parts of the guests 54 and/or the performers 74. For example, different groups of guests 54 entering the attraction may receive detectable markers 90 with different UV components which may correspond with different teams on the ride 68. The camera 60 may look for an exact wavelength to distinguish between the guests 54. As such, a group of guests 54 may battle, compete, work together, or the like during the ride 68. In this way, the guests 54 may have a more interactive experience on the ride 68. In another embodiment, the guests 54 and/or performers 74 may have a personalized avatar (e.g., avatar, animated figure) that may be controlled with the show effects 58. As such, it may be beneficial for the show effect system to associate a detected wavelength of the detectable marker 90 with a personalized avatar of the guest 54 or a detected wavelength with an animated figure of the performer 74. Accordingly, the guests 54 and/or performer 74 may go into the environment with the ability to trigger show effects 58 without having to bring, carry, or contact/manipulate a prop or something tangible.

In an embodiment, the detectable marker 90 may be a non-toxic material and invisible to the human eye. While the illustrated embodiments describe the detectable marker 90 including the UV powder, the detectable marker 90 may include an infrared (IR) powder, liquid, gel, or any other suitable component that may be invisible to the human eye. Still, in another embodiment, the detectable marker 90 may be a visible marker, such as a stamp, a sticker, a tag, or any suitable marker to track a motion of the guests 54 or the performers 74. For example, the detectable marker 90 may be a small stamp from an ink pad that may applied by an operator to facilitate a storytelling aspect of the environment. The environment may be a train station and the guests 54 may receive a stamp as an admissions ticket for boarding a train. As such, it may be beneficial for the guests 54 to receive a visible marker to further the story. The system may track the visible marker and a motion that may be associated with the visible marker.

Figure 5:
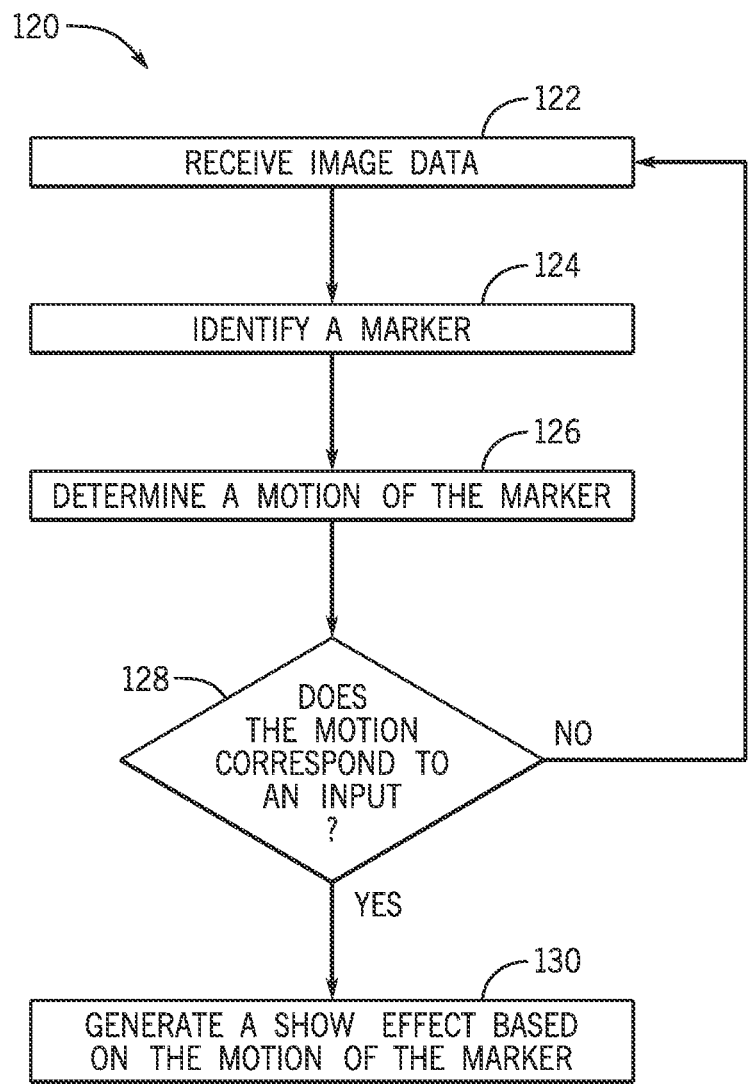
FIG. 5 is a flowchart of an embodiment of a process for generating the show effects via the attraction system of FIG. 1, in accordance with an aspect of the present disclosure.

FIG. 5 is an example method 120 for identifying the detectable marker 90 in the image data and generating the show effect 58 based on a motion of the marker 90. For example, a guest 54 may receive a detectable marker 90 by an applicator 56 in the guest area 52 to create show effects 58. In another example, a performer 74 may receive the detectable marker 90 on a hand to create show effects 58 (e.g., control an animated figure) during a performance. As described herein, the detectable marker 90 may include a UV component that may be identified by the camera 60.

The method 120 includes various steps represented by blocks. It should be noted that the method 120 may be performed as an automated procedure by a control system, such as the control system 62 of FIG. 1. Although the flow chart illustrates the steps in a certain sequence, it should be understood that the steps may be performed in any suitable order and certain steps may be carried out simultaneously, where appropriate. Further, certain steps or portions of the method 120 may be performed by separate systems or devices.

At block 122, the control system 62 may receive image data from the camera 60 from the ride 68, the guest area 52, the performance area 72, and/or the audience area 76. For example, the camera 60 may be placed within the ride 68 and capture image data of the vehicle 70 with one or more guests 54 as it travels through the ride 68. In another example, the camera 60 may be placed within the performance area 72 and/or the audience area 76 and capture image data of the performers 74 and/or the guests 54. As such, the camera 60 may locate one or more detectable markers 90 within the image data.

At block 124, the control system 62 may identify a detectable marker 90 within the image data. For example, the detectable marker 90 may be one or more dots with a size, a shape, a wavelength, a pattern, or the like that may be applied by the applicator 56. A shape of the detectable marker 90 may be a hand of the guest 54 and/or the performer 74 if they coated the hand with the detectable marker 90. As such, the control system 62 may use machine learning and/or image recognition techniques to identify one or more hands present within the environment. In another example, the camera 60 may detect a certain wavelength of the detectable marker 90, such as UV-B. As such, the control system 62 may identify a shape and wavelength of the detectable marker 90 within the image data. In certain embodiments, the guests 54 and/or performers 74 may, often inadvertently, transfer the detectable marker 90 to other parts of their body, onto other people, or within the environment. For example, the guest 54 may apply a lotion with the detectable marker 90 and touch their face before the lotion has completely dried. As such, the guest 54 may transfer portions of the detectable marker 90 to their face. The control system 62 may use secondary template imaging techniques to identify the detectable marker 90 and filter out (e.g., discard, discount) the transferred portions. In another example, the performer 74 may receive the detectable marker 90 shaped as a circle. However, the applicator 56 may apply an incomplete circle (e.g., semi-circle, quarter circle), such as if the reservoir runs out of detectable marker material. The control system 62 may be able to identify the detectable marker 90 by estimating the circle or completing the circle with image recognition techniques and/or classifying the incomplete circle as the circle via machine learning techniques (e.g., the training set includes the incomplete circle).

At block 126, the control system 62 may determine a motion of the marker 90. The control system 62 may track the detectable marker 90 to determine the motion. For example, the guest 54 may receive the detectable marker 90 on a left hand. The guest 54 may move the left hand in a certain pattern, motion, or movement. The control system 62 may track the detectable marker 90 on the left hand as a guest input. In another example, the performer 74 may receive one or more detectable markers 90 on one or more body parts. The control system 62 may track the movement of the one or more detectable markers 90 as a performer input.

At block 128, the control system 62 may determine whether the motion is associated with or corresponds to an expected input (e.g., stored motion; target motion; target input). For example, the control system 62 may include a database of expected inputs and corresponding show effects 58. The control system 62 may further associate an attraction system (e.g., first attraction system 50*a*, second attraction system 50*b*) with the corresponding show effects 58*a*, 58*b*. For example, the first attraction system 50*a* may be related to a fantasy dragon world and the expected inputs and/or the corresponding show effects may also be related to the dragon world. The guest 54 in this environment may wave their hands with the detectable marker 90 to trigger a dragon blowing fire. The guest 54 may shake their hands to help crack a dragon egg. In another example, the attraction system may be related to a soccer game, as such the expected inputs and/or the corresponding show effects may be related to kicking and blocking a soccer ball. The control system 62 may analyze the image data to determine whether the motion matches the expected input, and thus is related to and/or induces any show effect 58. As such, the control system 62 may check the database for any expected input that matches the motion, movement, or pattern received at block 126.

In certain embodiments, the control system 62 may determine that the motion may not be related to an expected input for triggering the show effect 58. As such, the system may not generate a show effect 58. For example, the guests 54 may leave residual marks (e.g., portions of UV components) on the vehicle 70. The movement of the residual marks may not be associated with a motion and therefore may not cause a show effect 58. In another example, the guest 54 may move the detectable marker 90 in a motion that may not be recognized by the control system 62. For example, the guest 54 may move their hand to scratch their head. This upwards movement may not be recognized by the control system 62 as matching any expected input, and therefore, the control system 62 may disregard the movement and may not trigger the show effect 58. The process may return to block 122 to receive image data from the camera 60.

In an embodiment, the control system 62 may determine that the motion corresponds to the expected input. At block 130, the control system 62 may generate a show effect 58 based on the motion of the marker 90. For example, the guest 54 may move their hand in a downward motion, which the control system 62 may associate with triggering generation of a show effect 58. As shown in FIG. 2, the downward motion of the detectable marker 90 may create a ghost. The tracking of detectable markers 90 may limit variability of the show effect system and allow the show effect system to accurately and quickly distinguish between successful and unsuccessful motions. As such, the show effect system may respond to triggers in real-time creating an immersive experience for the guests 54. The guests 54 and the performers 74 may collectively be referred to as users of or participants in the show effect system.

While only certain features of the invention have been illustrated and described herein, many modifications and changes will occur to those skilled in the art. It is, therefore, to be understood that the appended claims are intended to cover all such modifications and changes as fall within the true spirit of the invention. It should be appreciated that any features shown and described with reference to FIGS. 1-5 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function)" or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A show effect system, comprising:
    an applicator configured to apply a detectable marker, wherein the detectable marker comprises an ultra-violet (UV) component detectable by a camera;
    the camera configured to detect UV light corresponding to UV-A, UV-B, UV-C, or any combination thereof to detect the UV component and to generate image data representative of the detectable marker in an environment; and
    a control system communicatively coupled to the camera and comprising a processor and a memory, wherein the memory stores instructions executable by the processor, and the instructions are configured to cause the processor to:
        determine a motion of the detectable marker based on the image data;
        determine that the motion of the detectable marker corresponds to a target motion;
        identify a show effect that is associated with the target motion; and
        trigger generation of the show effect in the environment.

2. The show effect system of claim 1, wherein the detectable marker comprises a single dot on a guest or a performer in the environment.

3. The show effect system of claim 1, wherein the detectable marker comprises a plurality of dots on a guest or a performer in the environment.

4. The show effect system of claim 1, wherein the applicator is configured to apply the detectable marker to a hand of a guest or a performer.

5. The show effect system of claim 1, wherein:
the applicator comprises a container configured to hold a lotion or a hand sanitizer mixed with the UV component; and
the applicator is configured to enable a guest to interact with the container to coat one or more hands of the guest with the lotion or the hand sanitizer mixed with the UV component to apply the detectable marker.

6. The show effect system of claim 1, wherein the applicator is configured to apply the detectable marker such that a first guest receives a first detectable marker with a first UV component detectable by the camera at a first wavelength and a second guest receives a second detectable marker with a second UV component detectable by the camera at a second wavelength, and the instructions are configured to cause the processor to distinguish the first guest from the second guest based on the image data representative of the first detectable marker and the second detectable marker within the environment.

7. The show effect system of claim 1, wherein the instructions are configured to cause the processor to apply image recognition algorithms to identify a specific representation of the detectable marker in the image data.

8. The show effect system of claim 1, wherein the applicator is configured to apply the detectable marker having a shape, and the instructions are configured to cause the processor to apply machine learning algorithms to identify the detectable marker in the image data based on the detectable marker having the shape or a similar shape.

9. The show effect system of claim 1, wherein the show effect comprises a change to an animated character presented on a display screen.

10. The show effect system of claim 1, wherein the detectable marker comprises a powder or a liquid, and the UV component comprises a UV chemical.

11. A show effect method, comprising:
applying, via an applicator, a marker to a guest, wherein the marker comprises a chemical component detectable by a camera configured detect light in a wavelength range between 10 and 400 nanometers;
receiving, using one or more processors, image data from the camera, wherein the image data is representative of the marker in an environment;
determining, using the one or more processors, a motion of the marker based on the image data;
determining, using the one or more processors, that the motion of the marker corresponds to a target motion;
identifying, using the one or more processors, a show effect associated with the target motion; and
generating, using the one or more processors, the show effect in the environment.

12. The show effect method of claim 11, wherein the marker is a temporary marker that is applied to skin or clothing of the guest.

13. The show effect method of claim 12, wherein the marker comprises a first portion on a left hand of the guest and a second portion on a right hand of the guest, wherein the first portion comprises the chemical component detectable by the camera in a first region of the wavelength range and the second portion comprises the chemical component detectable by the camera in a second region of the wavelength range.

14. The show effect method of claim 11, comprising:
identifying, using the one or more processors, the marker within the image data based on the marker corresponding to at least a portion of a target pattern or a target shape.

15. The show effect method of claim 14, comprising:
removing, using the one or more processors, one or more transferred portions of the marker from the image data based on identifying the marker within the image data.

16. The show effect method of claim 11, comprising:
applying, via the applicator, an additional marker to an additional guest, wherein the additional marker comprises an additional chemical component detectable by the camera;
determining, using the one or more processors, an additional motion of the additional marker based on the image data, wherein the image data is representative of the additional marker in the environment;
determining, using the one or more processors, that the additional motion of the additional marker corresponds to an additional target motion;
identifying, using the one or more processors, an additional show effect associated with the additional target motion; and
generating, using the one or more processors, the additional show effect in the environment.

17. A show effect system, comprising:
a control system comprising a processor and a memory, wherein the memory stores instructions executable by the processor, and the instructions are configured to cause the processor to:
receive, via a camera, image data representative of a marker that is applied to a guest or a performer in an environment, wherein the marker comprises an ultraviolet (UV) component detectable by the camera;
determine a motion of the marker based on the image data;
determine that the motion of the marker corresponds to a target motion;
identify a show effect that is associated with the target motion; and
trigger generation of the show effect in the environment.

18. The show effect system of claim 17, comprising an applicator configured to apply the marker to the guest or the performer.

19. The show effect system of claim 17, wherein the UV component comprises a UV powder, a UV liquid, a UV paint, a UV chemical, or any combination thereof, and wherein the UV component is configured to absorb or reflect light in a detectable wavelength between 10 and 400 nanometers to be detectable by the camera.

20. The show effect system of claim 1, wherein the UV component is detectable by the camera in a presence of lighting.

* * * * *